United States Patent [19]

Bryans et al.

[11] 4,345,791
[45] Aug. 24, 1982

[54] CHILD RESTRAINT SYSTEM FOR A MOTOR VEHICLE

[75] Inventors: Thomas J. Bryans, Canton; Richard H. Miller, Wayne; Arthur W. Single, II, Plymouth, all of Mich.

[73] Assignee: Ford Motor Company, Dearborn, Mich.

[21] Appl. No.: 203,007

[22] Filed: Nov. 3, 1980

[51] Int. Cl.³ .................. A47C 1/08; B60R 21/10
[52] U.S. Cl. ............................ 297/250; 297/183; 297/216; 297/484; 297/DIG. 2
[58] Field of Search ............... 297/250, 253, 255, 216, 297/183, 377, 484; 280/743, 808

[56] References Cited

U.S. PATENT DOCUMENTS

| | | | |
|---|---|---|---|
| 3,424,497 | 1/1969 | Brilmyer et al. | 297/488 |
| 3,596,986 | 8/1971 | Ragsdale | 297/250 |
| 3,934,934 | 1/1976 | Farrell, Jr. et al. | 297/250 X |
| 4,047,755 | 9/1977 | McDonald | 297/216 |
| 4,155,591 | 5/1979 | Mauron | 297/216 |
| 4,186,962 | 2/1980 | Meeker | 297/216 |

*Primary Examiner*—James T. McCall
*Attorney, Agent, or Firm*—Peter D. McDermott; Roger L. May

[57] ABSTRACT

A child restraint system including a bolster supportable on a vehicle seat cushion and a child seat supportable on the bolster or seat cushion independently of the bolster. Both the bolster or the independently supported child seat are adapted to be retained by a seat belt. The child seat has a integrated harness system for restraining a child within the seat. Interengageable elements such as a tongue and groove elements couple the child seat to the bolster. A latch means is provided for latching the child seat to the bolster to retain the two in coupled relationship. The child seat, when coupled to the bolster, is oriented in an infant carrying mode in which the infant is faced to the rear of the vehicle, and when independently positioned on the seat cushion, is oriented in a booster seat mode in which the child is faced forwardly.

14 Claims, 7 Drawing Figures

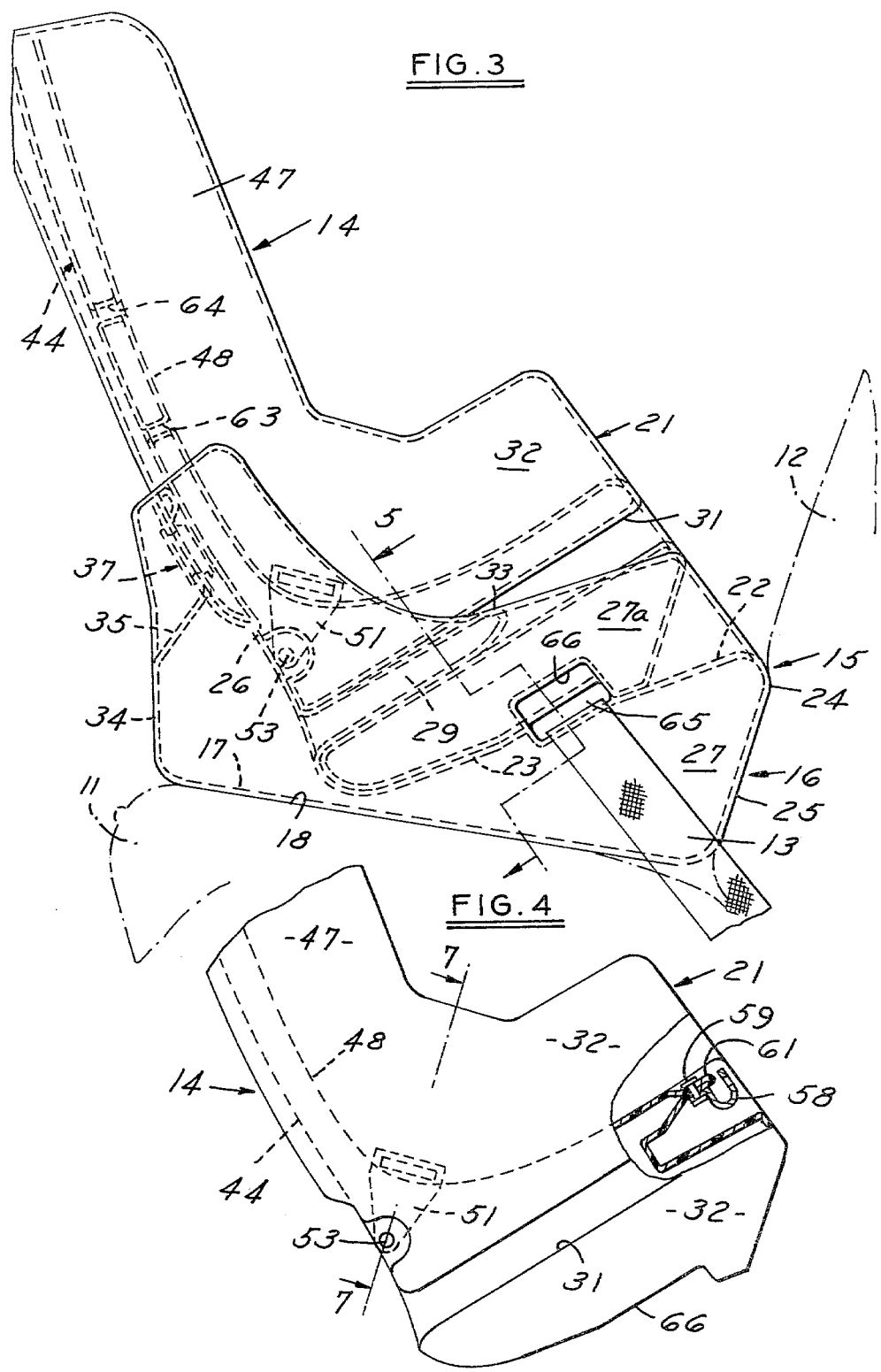

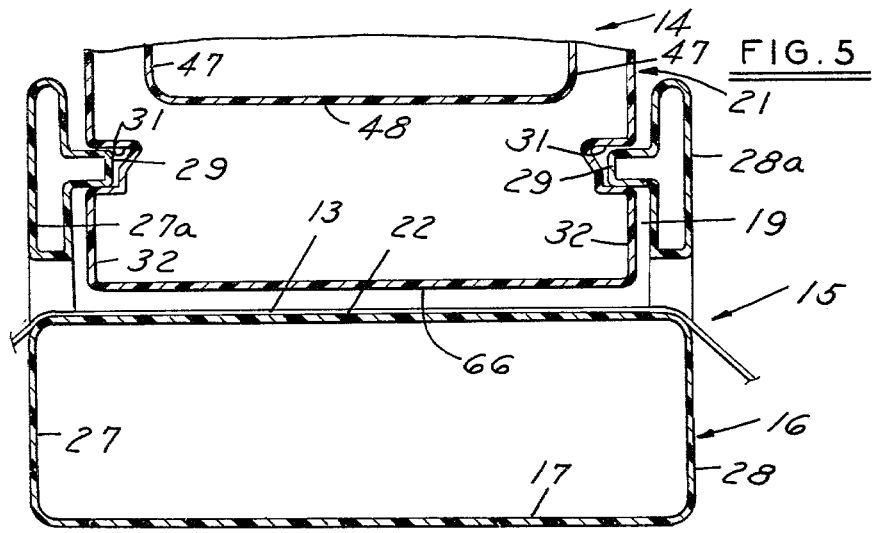
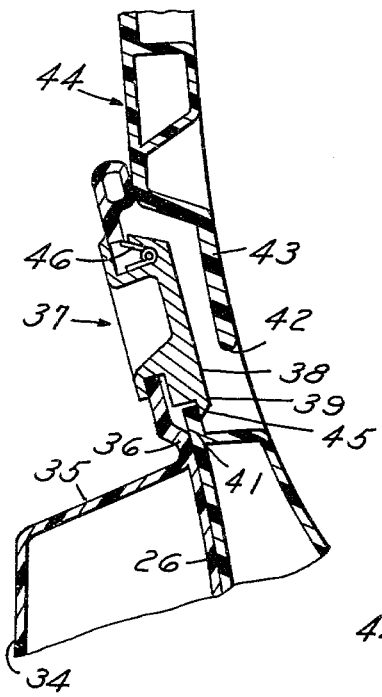
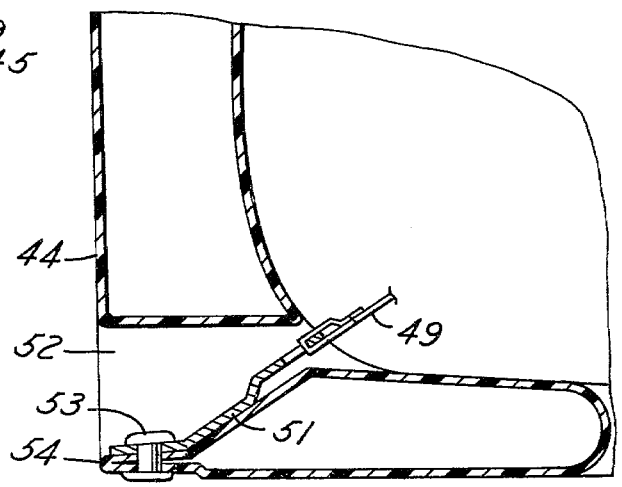

CHILD RESTRAINT SYSTEM FOR A MOTOR VEHICLE

PRIOR ART STATEMENT AND BACKGROUND OF THE INVENTION

Currently there are available several types of child restraint devices that comply with federal motor vehicle safety standards for use in motor vehicles. One of these devices is exemplified by U.S. Pat. No. 3,424,497 issued to H. G. Brilmyer et al on Jan. 28, 1969 for a "Safety Device for Restraining Passengers." The device disclosed in this patent is adapted to substantially surround a vehicle seat occupant. It has an integral crash panel spaced from the seat occupant that extends upwardly so that it is positioned forwardly of the upper torso and face of the passenger. It is held in place on the vehicle seat by a conventional vehicle seat belt. It is primarily designed to accommodate children in the 20–50 pound range.

Another of these devices is exemplified by U.S. Pat. No. 3,596,986 issued to La Verne B. Ragsdale on Aug. 3, 1971 for a "Baby Seat." The infant seat disclosed in this patent has a modified basket configuration that is primarily designed to accommodate infants from birth weight to 19 pounds. The device doubles as a protective restraint when used in the vehicle and as an infant carrier when used outside of the vehicle. When used in the vehicle, it rests on the passenger seat with the infant carrier facing rearwardly. The infant carrier is held in place on the vehicle seat by a vehicle seat belt.

Yet another one of these devices has the appearance of a winged back chair supported on an integral pedestal. This seat is adapted to support a child in the 17 to 40 pound range. It has an integral restraint system, is supported on the seat cushion with the child facing forwardly, and is held in place by a conventional vehicle seat belt.

All of these devices have in common that their components may be manufactured of injection molded, blow molded, or rotocast plastic capable of providing a rigid, lightweight structure for protecting and restraining a child occupant. Their disadvantage is that they cannot accommodate a child from birth weight through the 50 pound stage. There are available on the market, however, devices that can be converted from an infant carrying mode to a child seating mode. These devices generally comprise steel tubing frameworks with mechanical linkages that must be manipulated to make the conversion. A convertible unit that could be manufactured of plastic, that would not require mechanical linkages which would have to be manipulated to accomplish the conversion and that would accommodate by a simple reversal of the position of the main child restraint component a child over several years of its early life, would be of considerable value. The value would be not only as a result of compliance with government regulations, but also in encouraging parents to purchase the device for use in their vehicles.

SUMMARY OF THE INVENTION

A child restraint system constructed in accordance with this invention is adapted to be supported on a seat cushion of a vehicle seat and to be retained thereon by a seat belt. The restraint system comprises a bolster having a base portion adapted to be supported on the seat cushion. A child seat having a base portion is adapted to be mounted on the bolster or to be supported directly on the vehicle seat cushion. The child seat, when mounted on the bolster, is oriented to face rearwardly on the vehicle seat to cradle an infant therein; or when supported directly on the seat cushion, is oriented to face forwardly on the vehicle seat to provide a booster seat for a young child. Interengageable means on the bolster and on the child seat base portion cooperate to couple the two together when the child seat is supported on the bolster. A latch means is provided for releasably latching the bolster and child seat together when coupled. The vehicle seat belt is adapted to pass through receiving means in the bolster when the latter is used to support the child seat or to pass over a portion of the child seat when the latter is used independently of the bolster. The child seat has an integrated harness means to restrain an infant or young child within its confines independently of the seat belt.

DESCRIPTION OF THE DRAWINGS

Objects, advantages and features of the present invention will become more apparent as the description proceeds, reference being had to the accompanying drawings, wherein:

FIG. 3 is a side elevation of the child restraint system as it appears in the infant carrying mode when mounted on the vehicle seat;

FIG. 4 is a fragmentary view in part similar to FIG. 3 illustrating the lower portion of the child seat when separated from the supporting bolster;

FIG. 5 is a fragmentary section view on the line 5—5 of FIG. 3;

FIG. 6 is a fragmentary vertical section through the vertical center of the child restraint system illustrating the orientation of a latch mechanism for latching the child seat to the bolster; and FIG. 7 is a vertical section on the line 7—7 of FIG. 4.

DETAILED DESCRIPTION OF THE INVENTION

Figure 1:
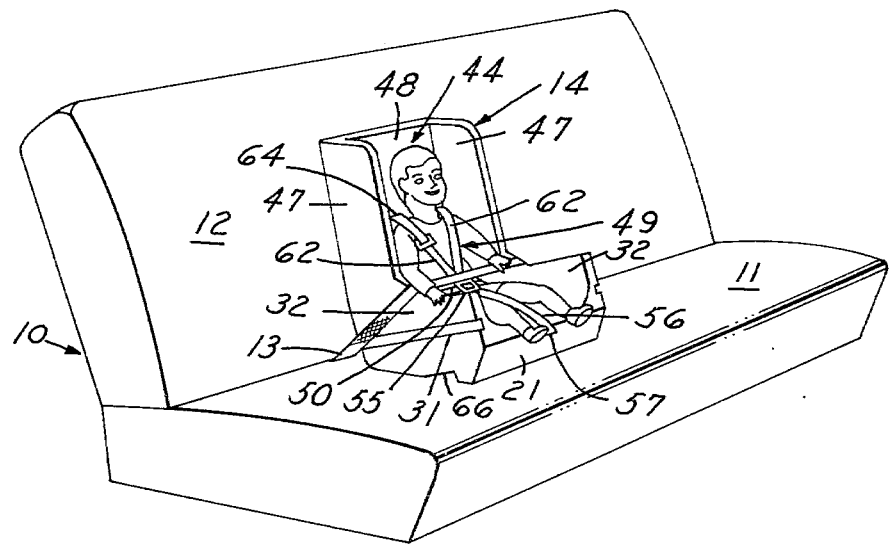
FIG. 1 is a perspective view of a child restraint system constructed in accordance with this invention illustrating its utility in a child seat mode.
Figure 2:
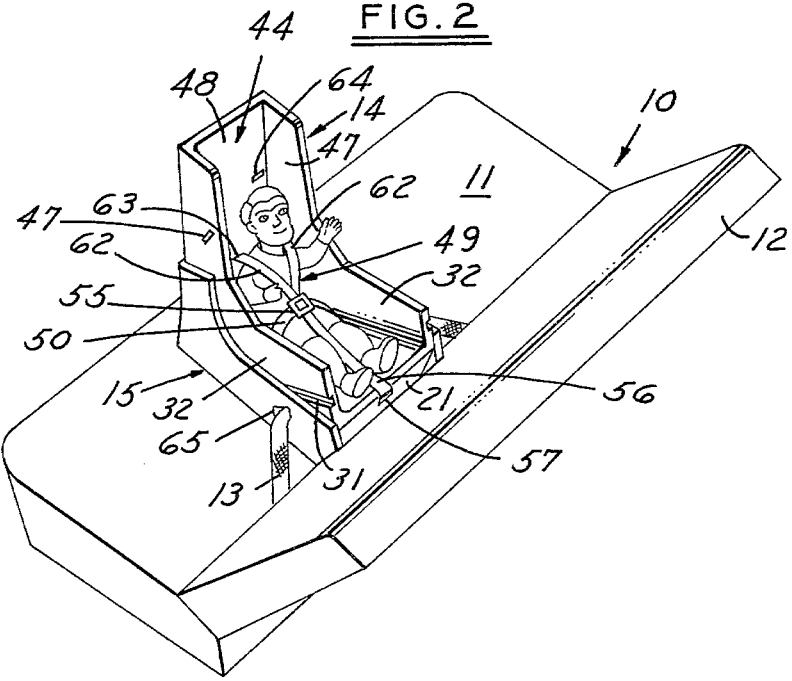
FIG. 2 is a perspective view of the child restraint system constructed in accordance with this invention illustrating its utility in an infant carrier mode.

Referring now in detail to the drawings, and in particular to FIGS. 1 and 2, the child restraint system embodying the present invention is adapted to be supported on a vehicle seat 10 having a seat cushion 11 and a backrest 12. A seat belt 13 extends across the seat cushion. In FIG. 1, the child seat component, generally designated 14, rests directly on the seat cushion 11 and is shown in an upright or child seating mode in which the child faces forwardly on the vehicle seat. In FIG. 2, the seat component 14 is shown in an angularly inclined, rearwardly facing position on the seat cushion with the infant seated therein facing the seat backrest. This orientation is hereinafter referred to as the infant carrier mode. In this mode the seat component is mounted on a bolster, generally designated 15.

With reference now to FIGS. 3 to 6, inclusive, the child restraint system will be described in its infant carrying mode. In this mode, utility is made of both the child seat component 14 and the bolster 15 which is interposed between the seat component 14 and the vehicle seat cushion 11. In the child seat mode as shown in FIG. 1, the bolster 15 is not utilized.

The bolster 15 is a rigid, molded plastic unit having a substantially hollow base 16 having a flat bottom 17 adapted to rest on the seating surface 18 of the vehicle seat cushion 11. The upper side of the bolster 15 is formed as a recess or pocket 19 adapted to receive the base 21 of the child seat component 14. More specifically, the base wall 22 of the recess 19 comprises a substantially planar portion 23 that is downwardly inclined from the upper end 24 of the front wall 25 of the bolster base 16 toward the bottom 17 of the latter. The planar portion 23 terminates short of the base bottom 17 and then turns upwardly to form a back portion 26 that limits the depth the base 21 of the seat component 14 can be positioned within the recess 19 of the bolster 15.

The sidewalls 27 and 28 of the bolster base 16 extend upwardly to form the sidewalls 27a and 28a of the recess 19, see FIG. 5. Projecting inwardly from each of the sidewall extensions 27a and 28a forming the sidewalls of the recess 19, are tongue elements 29 that coact with grooves 31 in the vertical sidewalls 32 of the base portion 21 of the child seat component 14. It will be understood, however, that the tongue elements 29 may be arranged on the sidewalls of the seat base portion 21 and the grooves in the recess 19 walls with equivalent function.

The longitudinal axes of the tongue elements 29 and the grooves 31 are angularly related to the bottom 17 of the bolster 14 and thus to the surface 18 of the vehicle seat cushion 12. The tongue elements 29 have tapered end portions 33 and are only slightly more than half as long as the grooves 31, for a reason to be explained.

The rear wall 34 at the end of the bolster 15 opposite the front wall 25 has a recessed pocket 35 provided with a reinforced depressed wall portion 36 having an aperture in which is seated a latch device 37, see FIG. 6. The latch device 37 has a spring-loaded latch plate 38 having a latch end 39 engageable with a keeper edge 41 on an aperture 42 in the rear upstanding wall 43 of the backrest 44 of the child seat component. The latch end 39 is tapered at 45 so that when the base 21 of the child seat component 14 is inserted fully into the bolster recess 19, the latch plate 38 will be slidably forced upwardly against the resistance of a spring 46 and then will rebound into latched position as shown in FIG. 6.

The child seat component 14, above its base portion 21, has the contour of a winged chair with its backrest 44 and protective sides 47. It is of hollow walled construction with the inner wall 48 being contoured to form the seating and backrest surfaces. Integrated with the child seat component 14 is a child restraint harness, generally designated 49, most clearly viewed in FIG. 2. The child restraint harness 49 preferably comprises lap belt segments 50, each anchored at one end to an anchor plate 51. The lap belt segments project through an aperture in a corner of the seat and the anchor plate 51 is securely fastened by a rivet or bolt 53 to a reinforced wall section 54, see FIG. 7. The free ends of the belt segments 50 are engaged to buckle elements 55 in a conventional manner. The child restraint harness 49 also has a single strap 56 extending from the buckle 55 to the front end of the seat where it projects through an aperture 57 into coupling engagement with a belt anchor 58 shown riveted at 59 to a reinforced wall portion 61. Extending from the buckle 55 to child seat backrest 44 are a pair of shoulder harness straps 62 adapted to pass through apertures 63 or 64 in the backrest to suitable anchor plates (not visible) secured to the child seat component 14. The plurality of apertures 63 and 64 are provided to accommodate children of different torso lengths, the shoulder straps being passed through the lower set of apertures 63 in the FIG. 2 infant carrying mode and through the upper set of apertures 64 in the FIG. 1 child seat mode.

In the child seat mode, the seat belt 13, anchored to vehicle body structure, passes over the child seat component 14 as seen in FIG. 1. In the infant carrying mode as shown in FIG. 2, the seat belt 13 holds the bolster 15 to the vehicle seat. The belt 13 is passed through apertures 65 in the bolster side sidewalls 27 and 28. The belt lies on the upper surface of the bolster wall 22. The underside of the base portion 21 of the child seat component 14 is offset at 66 to provide clearance for the belt therebeneath.

In summary, the child seat component 14 is adapted in a child seat mode, as shown in FIG. 1, to be supported directly on a vehicle seat cushion 11 with its backrest 44 in abutting relation to the vehicle seat backrest 12. In this position, it is oriented to support a child in an elevated but normal forward facing direction. The child is restrained in the child seat by the child restraint harness 48 and the child seat with its occupant is held on the vehicle seat by the vehicle anchored seat belt 13. In the child seat mode, the child seat component 14 is designed to accommodate a normal size child in the 20–50 pound range.

The child seat component 14 also is adapted in an infant carrying mode, as shown in FIG. 2, to be superimposed on the bolster 15. When used in this mode, the infant may be strapped into the seat component 14 at a location removed from the vehicle seat 10. The seat component 14 functions as an infant carrier. The infant carrier and infant may then be transported as a unit to the bolster 15, the latter having previously been positioned on the seat cushion 11 and strapped thereon with its wall end, previously defined as the bolster front end 25, in abutting relation to the vehicle seat backrest 12. The infant carrier may then be dropped down on the bolster 15 in such a way that the tapered ends 33 of the bolster tongue elements 29 are able to enter the grooves 31 in the sidewall extensions 27a and 27b of the base 21 of the seat component 14. The seat component 14 may then be permitted to slide down the tongue elements 29 until fully seated in the recess 19 of the bolster 15. The latch 37 will automatically latch the seat component 14 to the bolster, as previously explained. The infant will be cradled in the space between the seat component and the vehicle seat backrest and will have a rearwardly facing orientation.

Removal of the infant carrier (seat component 14) and infant from the bolster requires reverse movements from those required for the assembly of the carrier and bolster once the latch device 37 has been manually released by sliding the latch plate 38 upwardly against the resistance of spring 46.

As an infant carrier, the child restraint system disclosed is designed to accommodate an infant in the birth weight to 20 pound range. It will be understood, however, that the components could be made larger or smaller, as desired.

Some advantages of the child restraint system are:

the purchase of one unit will serve a child from birth to about four years of age;

the unit can be injection or blow molded or rotocast of plastic materials to provide a system having no mechanical linkages or steel tubing, while providing the necessary rigidity and durability at a substantial weight saving;

as a rear facing infant carrier, the bolster can be attached semipermanently to the vehicle seat by a vehicle mounted lap belt. The infant carrier seat easily can be removed from the bolster and car for easy transportation and harnessing or unharnessing of the infant away from the automobile. The bolster can also be removed with the seat and carried as a unit for use in a restaurant, etc.;

when used as a child seat, it provides reasonable seating height for good out-of-vehicle vision for a child without substantial interference with the vehicle driver's rear vision.

It is to be understood that this invention is not limited to the exact construction illustrated and described above, but that various changes and modifications may be made without departing from the spirit and scope of the invention as defined in the appended claims.

We claim:

1. A child restraint system comprising:
    a bolster adapted to be supported on a seat cushion of a vehicle seat and a child seat adapted to be supported on the bolster or directly on the seat cushion independently of the bolster,
    both the bolster with the child seat supported thereon or the independently supported child seat being held on the seat cushion by a seat belt,
    the child seat having a harness system integrated therewith to restrain a child independently of the seat belt,
    interengageable means for coupling the child seat to the bolster in an infant carrier mode when the child seat is supported thereon,
    and releasable latch means for latching the child seat to the bolster in the infant carrier mode.

2. A child restraint system according to claim 1, in which:
    the seat belt is threaded through seatbelt receiving apertures in sidewalls of a base portion of the bolster to retain the latter on the vehicle seat when supporting the child seat and passes over a portion of the child seat when the latter is independently supported on the seat cushion.

3. A child restraint system according to claim 1, in which:
    the orientation of the child seat when coupled to the bolster is such that in the infant carrying mode the infant faces rearwardly on the vehicle seat.

4. A child restraint system according to claim 1 or 3, in which:
    the interengageable means for coupling the child seat to the bolster comprises tongue and groove elements in contiguous sidewalls of the bolster and child seat,
    the tongue and groove elements being angularily disposed relative to the surface of the seat cushion to provide a predetermined tilt to the child seat when supported on the bolster in the infant carrier mode.

5. A child restraint system adapted to be supported on a seat cushion of a vehicle seat and to be retained thereon by a seat belt, comprising:
    a bolster having a base portion adapted to be supported on the seat cushion,
    a child seat having a base portion adapted to be mounted on the bolster or to be supported directly on the vehicle seat cushion,
    the child seat when mounted on the bolster being oriented to face rearwardly on the vehicle seat to cradle an infant therein or when supported directly on the seat cushion being oriented to face forwardly on the vehicle seat to provide a booster seat for a young child,
    interengageable means on the bolster and child seat for coupling the two together when the child seat is supported on the bolster,
    and latch means for releasably latching the bolster and child seat together when coupled,
    the seat belt being adapted to pass through receiving means in the bolster when the latter is used to support the child seat or to pass over a portion of the child seat when the latter is used independently of the bolster,
    the child seat having harness means integrated therewith to restrain an infant or young child independently of the seat belt.

6. A child restraint system adapted to be supported on a vehicle seat having a seat cushion and a backrest and a seat belt extending across the seat cushion, comprising:
    a bolster having a hollow base the bottom of which is adapted to rest on the vehicle seat cushion with one end abutting the backrest,
    a separate child seat having a base, the upper surface of which forms a seat and an upstanding integral backrest,
    the bolster having a recess complementary to the child seat base to receive the latter,
    interengageable means on the sidewalls of the bolster recess and the adjacent sidewalls of the child seat base for coupling the two together,
    releasable latch and keeper means mounted in contiguous walls of the bolster and the backrest for latching the bolster and child seat together,
    seat belt receiving means on the bolster for receiving the seat belt to retain the bolster on the seat cushion,
    and harness means integrated with the child seat to restrain an infant or young child in the child seat.

7. A child restraint system according to claim 6, in which:
    the interengageable means coupling the child seat to the bolster provides a child seat angle and direction orientation means whereby the child seat when coupled to the bolster is positioned in an infant carrier mode with the infant facing the vehicle seat backrest.

8. A child restraint system according to claim 6, in which:
    the interengageable means coupling the child seat to the bolster provides a child seat orientation means whereby the child seat may be removed from the bolster in a direction toward and upwardly in front of the vehicle seat backrest without disengaging the seat belt retaining the bolster on the seat.

9. A child restraint system according to claim 8, in which:
    the child seat orientation means inclines the child seat in an infant carrier mode with the infant facing the seat backrest.

10. A child restraint system according to claim 6, in which:
    the bolster recess has a base wall including a first planar portion downwardly inclined from the bolster end abutting the backrest, the first planar portion terminating short of an intersection with the bottom of the bolster base and then turns upwardly at substantially a right angle toward the opposite end of the bolster.

11. A child restraint system according to claim 6, in which:

the interengageable means comprises tongue and groove elements that are angularly disposed relative to the surface of the seat cushion to provide a predetermined tilt to the child seat to position the latter in an infant carrier mode.

12. A child restraint system according to claim 11, in which:

in the infant carrying mode the infant faces toward the seat backrest.

13. A child restraint system according to claims 8 and 9, in which:

the interengageable means comprises tongue elements projecting into the recess from the sidewalls of the latter into grooves in the adjacent sidewalls of the child seat base.

14. A child restraint system according to claim 13, in which:

the relative length of the tongues and grooves are unequal to permit the child seat to be removed from the bolster by sliding the child seat toward the vehicle seat backrest for a distance less than the length of the seat base sidewalls.

* * * * *